United States Patent [19]
Nägele et al.

[11] Patent Number: 6,008,839
[45] Date of Patent: *Dec. 28, 1999

[54] PROCESS AND APPARATUS FOR DISPLAYING THREE-DIMENSIONAL VIDEO IMAGES

[75] Inventors: Ulrich Nägele, Bartholomä ; Dieter Quendt, Essingen; Ulrich Gold, Aalen, all of Germany

[73] Assignee: Carl-Zeiss-Stiftung, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/565,632

[22] Filed: Nov. 27, 1995

[30] Foreign Application Priority Data

Nov. 25, 1994 [DE] Germany .............. 44 41 948

[51] Int. Cl.$^6$ .............. H04N 13/02; H04N 15/00; H04N 9/47; H04N 13/04
[52] U.S. Cl. .............. 348/47; 348/55
[58] Field of Search .............. 348/43, 46, 47, 348/51, 52, 42, 48, 55, 56; H04N 13/02, 15/00, 9/47, 13/04

[56] References Cited

U.S. PATENT DOCUMENTS

| 3,674,921 | 7/1972 | Goldsmith .............. 178/5.4 R |
| 4,562,463 | 12/1985 | Lipton .............. 348/56 |
| 4,567,513 | 1/1986 | Imsand .............. 348/42 |
| 5,083,851 | 1/1992 | MacDonald .............. 359/462 |
| 5,142,357 | 8/1992 | Lipton et al. .............. 348/48 |
| 5,193,000 | 3/1993 | Lipton et al. .............. 358/92 |
| 5,416,510 | 5/1995 | Lipton et al. .............. 348/43 |
| 5,432,543 | 7/1995 | Hasegawa et al. .............. 348/45 |
| 5,671,007 | 9/1997 | Songer .............. 348/49 |

FOREIGN PATENT DOCUMENTS

WO9308665  4/1993  WIPO .

Primary Examiner—Bryan Tung
Assistant Examiner—Nhon T. Diep

[57] ABSTRACT

In a process for the display of three-dimensional video images, in which at least two associated stereoscopic left-hand and right-hand partial images are electro-optically sensed at a given read-in frequency and the partial images are then sequentially reproduced on a display, the sensing of the two partial images takes place with a constant delay time with respect to each other, so that a delay which remains constant is ensured between the image formation in the camera and the reproduction of the partial image.

23 Claims, 1 Drawing Sheet

PROCESS AND APPARATUS FOR DISPLAYING THREE-DIMENSIONAL VIDEO IMAGES

BACKGROUND OF THE INVENTION

1. Field of the Invention

The present invention relates to a process, and also an apparatus, for displaying three-dimensional video images.

2. Discussion of Prior Art

So-called sequential 3D-TV systems are known, for example from the International Patent Application WO 93/08665 of Applicant's assignee, Carl-Zeiss-Stiftung, which is incorporated herein by reference, and from U.S. Pat. No. 4,562,463. In these patent documents, the three-dimensional image to be displayed is simultaneously sensed by two respective video cameras from two perspectives, and the stereoscopic partial images obtained are stored intermediately in suitable memory units. After the intermediate storage has been completed, the stereoscopic partial images are displayed alternatingly on a suitable display. The viewer, in order to perceive a spatial impression, wears so-called shutter spectacles, which at any given time release the view of one of the two partial images and which are synchronized with the switching frequency of the stereoscopic partial images on the display. It is known, as an alternative to this, to place a screen shutter element having a large area directly in front of the display, while the viewer wears corresponding polarizing spectacles.

In the cited International Patent Application WO 93/08665, partial memories are provided for flicker-free display of the three-dimensional images. These partial memories can be read out as a partial image is read in. The synchronization cost for signal processing is thereby reduced in comparison with U.S. Pat. No. 4,562,463. The process disclosed in International Patent Application WO 93/08665 is fully satisfactory for three-dimensional display of images that contain little motion, such as, for example, in minimally invasive surgery. However, known disadvantages can result in the case of rapidly moving images or moving cameras. Thus, because of the selected reproduction sequence of the stereoscopic partial images, partial images that were taken earlier are displayed on the display at a later reproduction instant. A known "jittering" of the three-dimensionally perceived image can result for the observer.

SUMMARY OF THE INVENTION

The object of the present invention is to provide a process having as low a cost as possible, and a corresponding apparatus for displaying three-dimensional video images that avoid the above mentioned disadvantages within a sequential 3D-TV system.

These objects are achieved according to the present invention by sensing at least two stereoscopic left-hand and right-hand partial images with a constant delay time relative to each other and at a pre-determined read-in frequency, and subsequently reproducing the partial images; with an apparatus having two video cameras for sensing at least two stereoscopic left-hand and right-hand partial images at a pre-determined read-in frequency, reproducing means for sequentially reproducing the partial images, and a synchronized connection between the two video cameras for delaying recording processes of the two video cameras, one with respect to the other, by a pre-determined constant delay time.

In contrast to the processes or apparatus known from the above mentioned patent documents, sensing of the stereoscopic partial images at the same time is intentionally dispensed with. According to the invention, recording or electro-optical sensing of the two stereoscopic partial images is synchronized with a constant, adjustable delay time. A delay that remains constant is ensured between formation of the image in the camera and image reproduction.

A display of the video images that has the correct time relationships is achieved by the use of partial memories, such as are known from International Patent Application WO 93/08665. This is expressed in the perceived monitor image in that even with images having rapidly moving image contents, or with movement of the camera, the previously mentioned "jittering" in the images is minimized.

The effects that are termed "spurious temporal parallax" in U.S. Pat. No. 4,562,463 are intentionally taken into account in the process according to the invention. The resulting "jumping" of the images in the z-direction is expressed for the viewer in only a slight impairment of the perception.

Moreover, the process according to the invention permits a doubling of the vertical resolution in comparison with the process known from International Patent Application WO 93/08665. While only a half-image per camera was processed in that process, processing of a whole image now takes place, i.e., both the half-images per sensed stereoscopic partial image are presented to the observer.

The process according to the invention is suitable both for the representation of three-dimensional images on a suitable display and for large-area projection on a corresponding projection surface.

Furthermore, the recording of the partial images obtained according to the invention is also possible with a conventional video recorder; here, however, a compromise may be required in that only every other half-image is recorded.

However, the stereoscopic whole images can be stored by means of a video recorder with increased recording frequency, if such a relatively costly system is available.

DESCRIPTION OF THE DRAWING

Further advantages and details of the process according to the invention will become apparent from the following detailed description of preferred embodiments with reference to the accompanying Figures, in which.

DETAILED DESCRIPTION OF PREFERRED EMBODIMENTS

Figure 1:
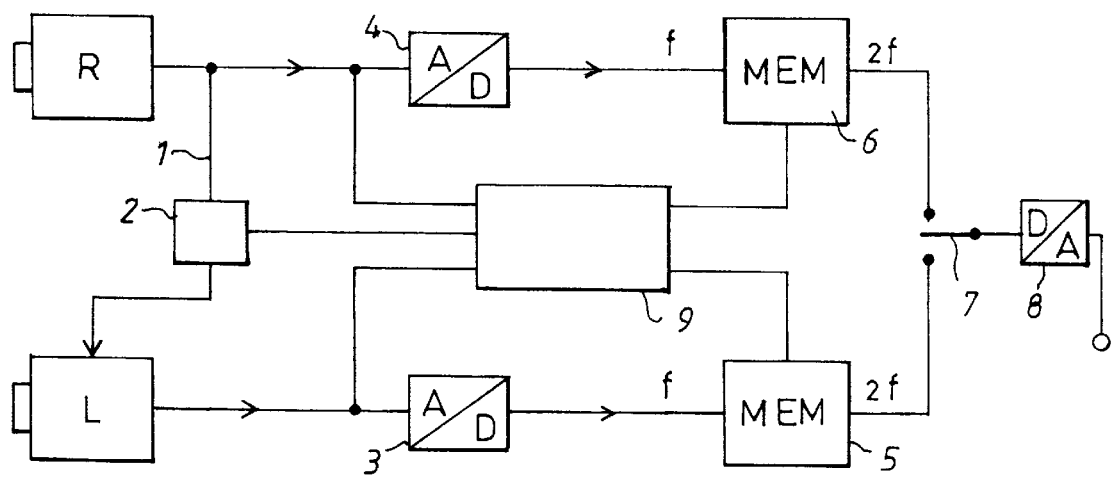
FIG. 1 shows a block circuit diagram of an embodiment of the apparatus for the display of three-dimensional images according to the invention.

FIG. 1 shows a block circuit diagram of a preferred embodiment of the apparatus according to the invention for the display of three-dimensional images. For the sake of clarity, the drawing shows only a single processing channel, in the left-hand and right-hand processing channels; i.e., the representation of parallel processing, e.g., RGB processing, has been intentionally omitted.

For electro-optical sensing of the stereoscopic partial images, two video cameras (L, R) are provided, arranged at a given distance from each other, which sense the desired image with a half-image frequency f=50 Hz, in the embodiment shown. A suitable video camera is, for example, the video camera of the Panasonic Company having the type designation WV-KS 152.

According to the invention, the left-hand and right-hand stereoscopic partial images are no longer sensed at the same time. Rather, the recording process of one of the two video cameras (L, R) is delayed by a pre-determined, selectable delay time with respect to the recording process of the other video camera (L, R). This takes place by a synchronizing connection (1), with a synchronizing device (2), between the two video cameras (L, R). In the embodiment shown, the genlock input of the left-hand video camera (L) is used for this purpose. Half of a half-image time is advantageously chosen as the constant delay time. The half-image time differs depending upon the color TV standard used; i.e., half of the half-image time is 10 ms when the PAL system is used, and 8.3 ms when the NTSC system is used, and so on. Consequently, the selected delay time is correspondingly different.

The signals supplied by the two video cameras (L, R) next pass to analog/digital (A/D) converter units (3, 4). Three such A/D converters (3, 4) per stereo channel are of course necessary for the processing of RGB signals, but this is not shown in FIG. 1. The signals, now digital, of the stereoscopic partial images are then passed at the read-in frequency f to the partial memories (5, 6) provided in the two stereo channels, and are read into them. The partial memories (5, 6) used here are advantageously the partial memories already known from the International Patent Application WO 93/08665, i.e., as corresponding half-image memories. Reading out of one half-image from these partial memories (5, 6) begins at a point in time at which the half-image has not yet been completely read in. As suitable partial memories (5, 6) or half-image memories, so-called FIFOs, or dual port RAMs, etc. may be used, which satisfy the stated requirements. Such partial memories (5, 6) are for example sold by the Cypress Company under the type designation CY7C474.

There thus results a doubling of the read-out frequency, and also of the reproduction frequency, of the stereoscopic left-hand and right-hand partial images, in comparison with the read-in frequency f; i.e., the switching frequency of the output left-hand and right-hand partial images is higher than the required minimum frequency, ensuring a flicker-free image. This minimum frequency is about 45 Hz.

The frequency-doubled signals of the stereoscopic partial images of the two stereo channels, having been read out from the partial memories via a following common switching unit (7), finally reach a D/A converter unit (8), which passes the output signals on to the respective display device (not shown). The switching unit (7) precedes the D/A converter unit (8) and serves to switch between the respective stereoscopic left-hand and right-hand partial images, at the corresponding doubled read-out frequency 2f, in order to ensure the desired flicker-free reproduction.

The display device, which is arranged following the D/A converter unit (8) and is not shown in FIG. 1, can be embodied either as a known RGB monitor or as a projection device. The display device used is of course chosen so that the stereoscopic partial images are reproduced at the corresponding doubled frequency, i.e., in the case of a 50 Hz read-in frequency, for example, a 100 Hz monitor is thus required.

The display device used is set up according to the memory configuration such that the display device operates either in interlaced mode or in non-interlaced mode.

To perceive the sequentially presented stereo images, the viewer wears known shutter spectacles, which are synchronized with the switching frequency of the stereoscopic partial images and alternately release the view of the respective partial image.

Alternatively, the three-dimensional images can be viewed on a monitor by means of a large-area shutter element arranged in front of the monitor, which changes its polarization characteristics at the reproduction frequency of the stereoscopic partial images. In this case, the viewer wears spectacles with lenses of correspondingly different polarization characteristics.

A control unit (9) is provided within the apparatus according to the invention, which controls the A/D converter units (3, 4), the D/A converter unit (8), the read-in and read-out processes of the partial memories (5, 6), and the corresponding synchronizing signal preparation for the two video cameras (L, R) via the synchronizing device (2).

Each of the partial memories (5, 6) in FIG. 1 has a minimum capacity of a half of a half-image per stereo channel, i.e., in principle half of a half-image memory per stereo channel is sufficient. The partial memories (5, 6) used in the two stereo channels can be embodied either as physically separated or as only logically separated units. In the latter case, this means that overall only a single such half-image memory with a memory capacity for a complete half-image is required.

Figure 2:
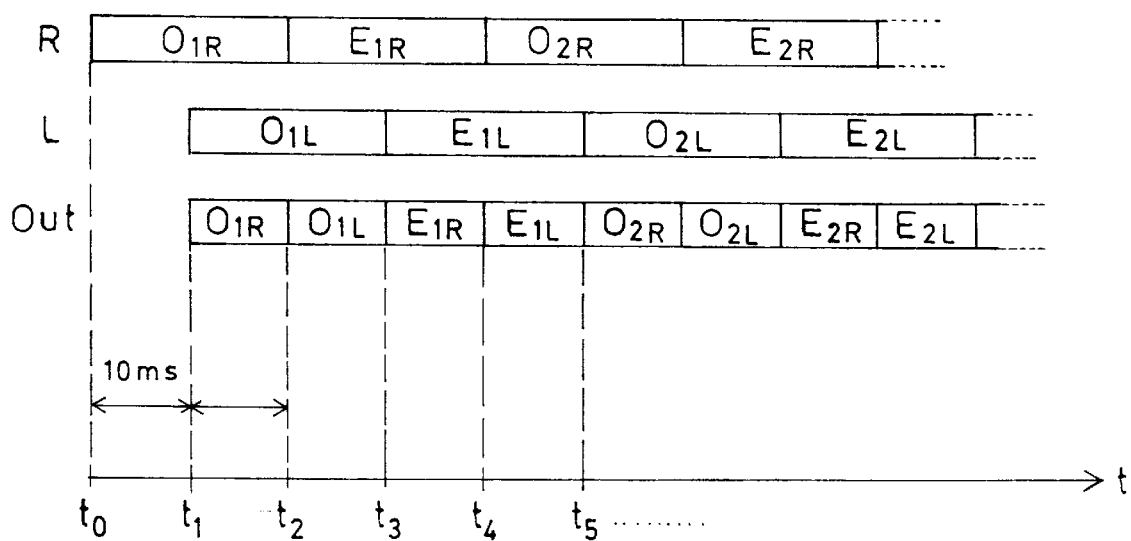
FIG. 2 shows a representation of the signal processing sequence with time, in the process according to the invention.

The principles of signal processing within the process according to the invention will be explained below with reference to FIG. 2. FIG. 2 illustrates the time course of the read-in processes of the camera signals into the partial memories associated with the two stereo channels, and the time course, synchronized therewith, of the reproduction of the stereoscopic partial images on the monitor, or the corresponding read-out processes from the partial memories used.

It is assumed in the preferred embodiment illustrated that the half-image duration is 20 ms, i.e., that a PAL system is used.

While the reading in of the first half-image ($O_{1R}$) of the first right-hand stereoscopic partial image takes place at the time $t=t_0$, the read-in process of the first left-hand image ($O_{1L}$) via the left-hand camera is delayed, and takes place at the time $t=t_1=t_0+10$ ms. In the embodiment shown, this consequently means a delay time of the read-in process by 10 ms.

At the same time, $t_1$, when the first half image ($O_{1R}$) of the first right-hand stereoscopic partial image has been half read-in, the read-out of the first half image ($O_{1R}$) of the right-hand stereoscopic partial image begins.

As soon as the first half-image ($O_{1L}$) of the left-hand stereoscopic partial image has been half read-in at the time $t=t_2=t_1+10$ ms, both the read-in process of the second half-image ($E_{1R}$) of the first stereoscopic partial image, and the read-out of the left-hand half-image ($O_{1L}$) of the first stereoscopic partial image from the associated partial memory begins. At the time $t=t_3=t_2+10$ Ms, simultaneously with the ending of the read-out process of the first half-image ($O_{1L}$) of the left-hand stereoscopic partial image, both the read-in process for the second half-image ($E_{1L}$) of the first stereoscopic left-hand partial image and the readout process of the second half-image ($E_{1R}$) of the first right-hand stereoscopic partial image begins. At the time $t=t_4=t_3+10$ ms, the read-out process of the second half-image ($E_{1R}$) of the first right-hand stereoscopic partial image is ended; simultaneously with the reading-in of the second left-hand stereoscopic partial image, which is still taking place, the read-out process of this half-image ($E_{1L}$) from the corresponding partial memory begins.

When this read-out process has ended, simultaneously with the read-in process for the half-image ($E_{1L}$) at the time $t=t_5$, the two stereoscopic partial images, left-hand and right-hand, have been consequently presented within the past 40 ms. for the observer on the monitor in a frame display, i.e., the complete content of all of the half-images sensed by the video cameras has been displayed.

The beginning of each read-out process begins from the time $t_1$, and thus always in the middle of the respective read-in process, so that the frequency-doubled read-out process always ends simultaneously with the read-in process of the respective half-image. The delay time between the left-hand and right-hand half-images is always constant, in the process according to the invention, from the time at which the partial images are generated by the video cameras until their reproduction in the respective display device.

Thus in the illustrated processing sequence of the process according to the invention, the frame reproduction of the stereoscopic partial images is possible, with which a doubling of the vertical resolution results in comparison with the process of International Patent Application WO 93/08665. In addition, it is ensured that the reproduced images are displayed in a correctly timed sequence, so that the impression of "jittering" of the images is minimized for the viewer.

Besides the processing sequence shown, with one partial memory per processing channel, each with a capacity of one half-image, an alternative process is possible according to the invention, with half-image memories which have a capacity for only half a half-image. These can be physically embodied as a single half-image memory having memory regions that are logically separated. A frame display with correspondingly increased resolution is also possible with such partial memories.

The recording processes of the two video cameras have a synchronized constant delay time, one with respect to the other, by half a half-image. As soon as a half-image of a stereoscopic partial image has been half read into the respective half-image memory region, there simultaneously begins the readout at double the read-in frequency. Simultaneously with this, the second half of this half-image is read into the portion of the same half-image memory that has become free. Consequently, the half of a half-image memory is completely filled at the beginning of each readout process.

With such a half-image memory configuration, a display device may be used that operates in an interlaced mode. As an advantage of such a choice of half-image memory, the memory requirement is further reduced.

In contrast, if a non-interlaced mode is desired, a configuration is necessary which has two complete half-image memories, as previously described.

In the case in which it is desired to record the stereoscopic partial images by means of a commercial video recorder, only every other half-image is recorded, that is, all the half-images supplied are read-in, as previously described, into the partial memory; however, the partial memories are read-out at only half the frequency and recorded by means of the video recorder. When the recorded stereoscopic video images are reproduced on a monitor, the respective absent lines are either blanked or calculated from the adjacent lines of the same half-image.

A signal to identify the left-hand or right-hand partial image is furthermore recorded with the recording of the stereoscopic partial images.

The process according to the invention was described by way of example in connection with the PAL system; it can also be used with any other TV system.

In non-interlaced operation, the two cameras do not supply any half-images ($O_{1R}$, $E_{1R}$, $O_{1L}$, $E_{1L}$), but respectively only frames without line interlacing. Corresponding cameras can for example be constructed from the CCD chip ICX074AL of the Sony Company. The required synchronizing process likewise results analogously from the process which has been described for half-image cameras, in that the concept "half-image" or "partial image" is replaced by "frame without interlacing". Recording of such frames with a commercial video recorder according to the PAL or NTSC standard can take place by intermediate storage and omission of the lines not required for the respective half-image.

We claim:

1. Process for displaying three dimensional video images comprising:

taking at least two stereoscopic left-hand and right-hand partial images at two cameras with a constant delay time relative to each other and at a pre-determined read-in frequency, and sequentially reproducing said partial images, wherein said constant delay time corresponds to a read-in duration of one half half-image time.

2. Process according to claim 1, further comprising:

storing each of said partial images between image-taking and reproduction in at least one partial memory, and reading out said partial images from said partial memory at twice said read-in frequency.

3. Process according to claim 1, wherein said image-taking step comprises:

taking two left-hand and two right-hand stereoscopic halt images of each original image to be taken.

4. Process according to claim 1, further comprising synchronizing electro-optical image-taking of said partial images in two video cameras with said constant time delay by means of a synchronizing connection.

5. Process according to claim 2, wherein said storing step comprises:

storing said partial images in at least one half half-image memory in each of two stereoscopic processing channels, and converting analog signals of said partial images from two video cameras into digital signals for said one half half-image memory.

6. Process according to claim 3, wherein said reproducing step comprises reproducing said partial images on a display in the following sequence:

right-hand half-image 1, odd numbered;
   left-hand half-image 1, odd numbered;
   right-hand half-image 1, even numbered;
   left-hand half-image 1, even numbered.

7. Process according to claim 1, further comprising:

selecting a color television system for displaying said three-dimensional video images, and selecting said constant delay time depending upon said selected color television system.

8. Process according to claim 7, wherein a constant delay time of 10 milliseconds is selected when a PAL standard is selected.

9. Process according to claim 7, wherein a constant delay time of 8.3 milliseconds is selected when a NTSC standard is selected.

10. Apparatus for displaying three dimensional video images, comprising:

two video cameras for taking at least two stereoscopic left-hand and right-hand partial images at a pre-determined read-in frequency, a reproducer that sequentially reproduces said partial images, and a synchronized connection between said two video cameras for delaying recording processes of said two video cameras, one with respect to the other, by a predetermined constant delay time that corresponds to a read-in duration of one half half-image time.

11. Apparatus according to claim 10, further comprising at least one partial memory that comprises a half-image memory into which said stereoscopic partial images are read at a read-in frequency and which is read-out at twice said read-in frequency, said half-image memory having a capacity at least sufficient for half a half-image.

12. Apparatus according to claim 11, further comprising projection apparatus connected to said half-image memory for displaying said stereoscopic partial images.

13. Process for displaying three dimensional video images comprising:

taking at least two stereoscopic left-hand and right-hand partial images at two cameras with a constant delay time relative to each other and at a pre-determined read-in frequency, sequentially reproducing said partial images, storing each of said partial images between image-taking and reproduction in at least one partial memory, and reading out said partial images from said partial memory at twice said read-in frequency, wherein said reading out of each of said partial images begins while said storing of said same partial image still takes place.

14. Process according to claim 13, wherein said image-taking step comprises:

taking two left-hand and two right-hand stereoscopic half images of each original image to be taken.

15. Process according to claim 13, further comprising synchronizing electro-optical image-taking of said partial images in said two cameras with said constant time delay via a synchronizing connection.

16. Process according to claim 13, wherein said storing step comprises:

storing said partial images in at least one half half-image memory in each of two stereoscopic processing channels, and converting analog signals of said partial images from two cameras into digital signals for said one half half-image memory.

17. Process according to claim 13, wherein said reproducing step comprises:

reproducing said partial images on a display in the following sequence;

right-hand half-image 1, odd numbered;

left-hand half image 1, odd numbered;

right-hand half-image 1, even numbered;

left-hand half-image 1, even numbered.

18. Process according to claim 13, further comprising:

selecting a color television system for displaying said three-dimensional video images, and selecting said constant delay time depending upon said selected color television system.

19. Process according to claim 18, wherein a constant delay time of 10 milliseconds is selected when a PAL standard is selected.

20. Process according to claim 18, wherein a constant delay time of 8.3 milliseconds is selected when a NTSC standard is selected.

21. Process for displaying three dimensional video images comprising:

taking at least two stereoscopic left-hand and right-hand partial images at two cameras with a constant delay time relative to each other and at a pre-determined read-in frequency, sequentially reproducing said partial images, storing each of said partial images between image-taking and reproduction in at least one partial memory, and reading out said partial images from said partial memory at twice said read-in frequency, wherein said reading out of each of said partial images begins while said storing of said same partial image still takes place, and said constant delay time corresponds to a read-in duration of one half half-image time.

22. Apparatus for displaying three dimensional video images comprising:

two video cameras for taking at least two stereoscopic left-hand and right-hand partial images with a constant delay time relative to each other and at a pre-determined read-in frequency, a reproducer that sequentially reproduces said partial images, at least one partial memory that stores each of said partial images between image-taking and reproduction, wherein said partial images are read into said partial memory at said predetermined read-in frequency and read out from said partial memory at twice said read-in frequency, and wherein reading out of each of said partial images begins while said storing of said same partial image still takes place.

23. Apparatus for displaying three dimensional video images comprising:

two video cameras for taking at least two stereoscopic left-hand and right-hand partial images with a constant delay time relative to each other and at a pre-determined read-in frequency, a reproducer that reproduces said partial images, and at least one partial memory that stores each of said partial images between image-taking and reproduction, wherein said partial images are read into said partial memory at said predetermined read-in frequency and read out from said partial memory at twice said read-in frequency, and wherein reading out of each of said partial images begins while said storing of said same partial image still takes place, and said constant delay time corresponds to a read-in duration of one half half-image time.

* * * * *